US008625682B2

(12) United States Patent
Guleryuz (10) Patent No.: US 8,625,682 B2
(45) Date of Patent: Jan. 7, 2014

(54) NONLINEAR, PREDICTION FILTER FOR HYBRID VIDEO COMPRESSION (75) Inventor: Onur G. Guleryuz, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 155 days.

(21) Appl. No.: 13/153,294

(22) Filed: Jun. 3, 2011

(65) Prior Publication Data
US 2011/0293006 A1 Dec. 1, 2011

Related U.S. Application Data (62) Division of application No. 11/471,741, filed on Jun. 20, 2006.

(60) Provisional application No. 60/692,767, filed on Jun. 21, 2005.

(51) Int. Cl.
*H04N 7/12* (2006.01)

(52) U.S. Cl.
USPC ............................................ 375/240.29

(58) Field of Classification Search
USPC ............. 375/240.01, 240.12, 240.18, 240.29
IPC ............................................. H04N 7/12
See application file for complete search history.

(56) References Cited

U.S. PATENT DOCUMENTS 7,769,089 B1 8/2010 Chou

OTHER PUBLICATIONS

US Office Action for related U.S. Appl. No. 11/471,741, Jun. 14, 2011, 11 pgs.

*Primary Examiner* — Young Lee
(74) *Attorney, Agent, or Firm* — Blakely, Sokoloff, Taylor & Zafman LLP (57) ABSTRACT

A method and apparatus for non-linear prediction filtering are described. The method may include performing motion compensation to generate a motion compensated prediction using a block from a previously coded frame. The method may also include performing non-linear filtering on the motion compensated prediction in the transform domain with a non-linear filter as part of a fractional interpolation process to generate a motion compensated non-linear prediction. The method may also include subtracting the motion compensated non-linear prediction from a block in a current frame to produce a residual frame, and coding the residual frame.

15 Claims, 9 Drawing Sheets

NONLINEAR, PREDICTION FILTER FOR HYBRID VIDEO COMPRESSION

PRIORITY

The present patent application is a divisional of patent application Ser. No. 11/471,741, titled "A Nonlinear, Prediction Filter for Hybrid Video Compression", filed Jun. 20, 2006, which claims priority to and incorporates by reference the corresponding provisional patent application Ser. No. 60/692,767, titled, "A Nonlinear, Prediction Filter for Hybrid Video Compression," filed on Jun. 21, 2005.

FIELD OF THE INVENTION

The present invention relates to the field of compression and decompression; more particularly, the present invention relates to non-linear prediction filtering in video compression and decompression processing.

BACKGROUND OF THE INVENTION

Hybrid video compression consists of encoding an anchor video frame and then predicatively encoding a set of predicted frames. Predictive encoding uses motion compensated prediction with respect to previously coded frames in order to obtain a prediction error frame followed by the encoding of this prediction error frame (i.e., the residual frame). Anchor frames and prediction errors are encoded using transform coders.

Figure 1:
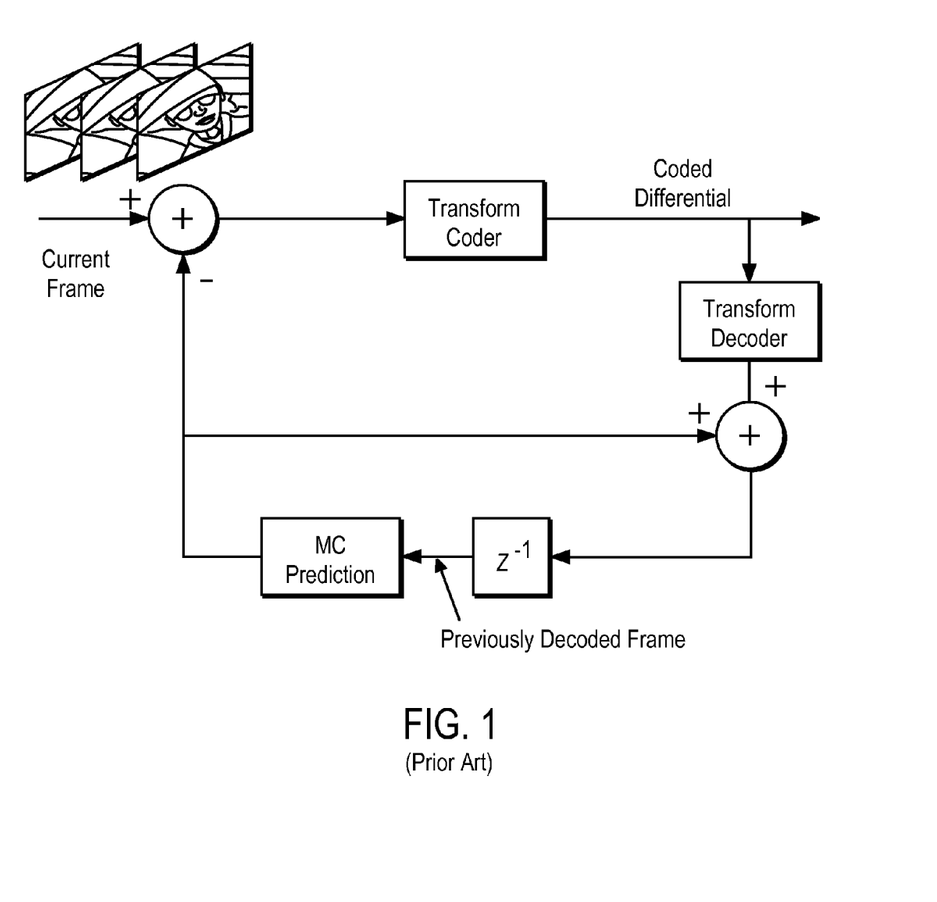
FIG. 1 is a block diagram of a video encoder.

FIG. 1 is a block diagram of a video encoder. Referring to FIG. 1, a motion compensated (MC) prediction module generates a motion compensated prediction from a previously decoded frame. A first adder subtracts the motion compensated prediction from a current frame to obtain a residual frame. A transform coder converts a residual frame to a coded differential, for example by using a combination of a transform, a quantizer, and an entropy encoder. During decoding, a transform decoder converts the coded differential to a reconstructed residual frame, for example by using a combination of an entropy decoder, an inverse quantizer, and an inverse transform. A second adder adds the reconstructed residual frame to the motion compensated prediction to obtain a reconstructed frame. A delay element "$Z^{-1}$" stores the reconstructed frame for future reference by the MC prediction module.

The generic motion compensated prediction operation is limited to forming predictors for the current frame by using blocks from previously coded frames directly, or by using low-pass filter based interpolations of these blocks. This process forms a good mechanism for exploiting temporal correlations.

There are well-known techniques that improve upon block based motion compensation by utilizing parametric motion models, overlapped motion compensation, various low-pass filter based interpolators, intensity compensation algorithms, etc. However, these solutions are restricted to very specific types of temporal evolutions in video frames and do not provide general solutions. See, for example, 1) Joint Video Team of ITU-T and ISO/IEC JTC 1, "Draft ITU T Recommendation and Final Draft International Standard of Joint Video Specification (ITU-T Rec. H.264|ISO/IEC 14496-10 AVC)," Joint Video Team (JVT) of ISO/IEC MPEG and ITU-T VCEG, JVT-G050, March 2003; and 2) MPEG4 Verification Model, VM 14.2, pp. 260-264, 1999.

There are a number of drawbacks in related art solutions. For example, prior solutions are limited to taking advantage of very specific types of temporal dependencies among video frames. Once motion estimation is done and candidate blocks in the anchor frame(s) are found, it is assumed that these blocks or their various low-pass filtered forms are the best predictors for the blocks in the predicted frame. Many temporal variations, such as small warps of blocks containing edges, temporally independent variations on otherwise temporally correlated, high frequency rich blocks, etc., are not accounted for by related art solutions. These unaccounted variations cause serious performance penalties as they produce motion compensated differentials that are very difficult to code with the transform coders employed in hybrid video coders.

Furthermore, some specific problematic temporal variations such as specific types of brightness variations have been incorporated into recent video compression standards. However, these solutions are not valid beyond the specific problems for which they are designed. Hence, they do not provide general and robust solutions.

Moreover, some related art typically proceeds with a piecewise smooth frame model under uniform translational motion assumptions and runs into problems whenever actual coded frames deviate from these assumptions.

SUMMARY OF THE INVENTION

A method and apparatus for non-linear prediction filtering are disclosed. In one embodiment, the method comprises performing motion compensation to generate a motion compensated prediction using a block from a previously coded frame, performing non-linear filtering on the motion compensated prediction in the transform domain with a non-linear filter as part of a fractional interpolation process to generate a motion compensated non-linear prediction, subtracting the motion compensated non-linear prediction from a block in a current frame to produce a residual frame, and coding the residual frame.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method, apparatus and article of manufacture for non-linear filtering of video frames that enables better hybrid video compression performance are described. The techniques described herein augment the motion compensated prediction process by supplying nonlinear filtering options beyond the well-known low-pass filter based interpolators. At each possible motion vector location, a traditional hybrid encoder will choose one of a set of fractional interpolators implemented using low-pass filters. Additional prediction modifiers take the same blocks from the previously coded frames and apply different nonlinear filters to form better predictors of the current frame.

The disclosed techniques add nonlinear filtering options implemented in transform domain to this set. In one or more embodiments, these nonlinear prediction options are generated by utilizing transform coefficient thresholding, coefficient magnitude based ranking, and their combinations to derive nonlinear filtered predictions in spatial domain. Nonlinear filtering options are efficiently captured in parameters that are sent to the decoder as part of the coded bit stream.

There are a number of benefits and advantages to using the techniques described herein. The described techniques are robust and general, being able to effectively handle a multitude of image region types and a multitude of compression techniques. The derived nonlinear prediction filters adaptively and autonomously develop the proper frequency selectivity for the multitude of image region types by developing low-pass selectivity in smooth image regions, high-pass selectivity in high-frequency regions, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

For the block to be predicted in the predicted frame, a candidate block from the previously coded frames is obtained. In order to enable various filtering operations, this candidate block can be of larger size than the block to be predicted. A candidate block of a size larger than the predicted block is reduced to the same size as the predicted block at the end of the filtering operation. The candidate block is first transformed using a linear transform to obtain its transform coefficients. An overcomplete set of linear transforms can also be used to generate transform coefficients. Candidate block transform coefficients are non-linearly modified in P different ways to produce P sets of coefficients that correspond to P different blocks. Each such set of coefficients is inverse transformed and then possibly reduced in size to obtain P prediction blocks for the block to be predicted. At the encoder, each of these P prediction blocks is compared to the block to be predicted. The best prediction is chosen and a corresponding prediction parameter is determined. The encoder then considers standard prediction options in addition to this non-linear prediction and signals the decoder as to which to use. Based on this signal, the decoder replicates the prediction process and obtains the same prediction block as the encoder.

In one embodiment, the non-linear modifications of candidate block coefficients take the form of thresholding the coefficients, sorting the coefficients based on magnitude and only retaining the largest R percent, indexing the coefficients and only retaining those having the prescribed indices (or those belonging to a given index set), and scaling the coefficients. Various combinations of these operations, while including at least one nonlinear operation, can be applied. A parameter is determined that is sent to the decoder as to which operation has been performed in the case that the encoder decides to use the nonlinear prediction. This parameter can take P different values, i.e., there are P different combined operations that can be done on a candidate block.

In one embodiment, the techniques described herein include a parameter overhead control operation in the form of a prediction scanning and elimination operation is incorporated to determine which of the P operations produce significant differences in the candidate block. In one embodiment, only operations that produce significant differences in the candidate block are considered by the encoder. This operation reduces the number of possible operations from P to Q<=P and it can be performed by the decoder as well. Therefore, if the encoder decides to utilize a non-linear prediction, it need only specify a parameter taking Q different values rather than P different values. This controls the amount of overhead bits necessary to include nonlinear prediction efficiently in a rate-distortion sense.

In one embodiment, the decision to use non-linear prediction is made at a block level, where the size of the block is determined by the transform used in the transform coding operation of the hybrid video coder.

In one embodiment, the linear transform applied to the candidate blocks as discussed above is an orthonormal transform, such as, for example, a block n×n DCT. Other transforms, such as, for example, non-orthogonal transforms and non-block transforms can also be applied. It is desirable but not necessary for this transform to have a fast implementation so that computations can be carried out in an efficient manner.

Let x (arranged into an M×1 vector) denote the block to be predicted. Let y (arranged into an N×1 vector) denote a candidate block from the frame used in predicting x. The candidate block y can be of size larger than x so that various filtering and interpolation opeartions are well defined. Let H denote the linear transform as specified in the above paragraph (an N×N matrix). The transform coefficients of y are given by d=Hy.

Interpolation operations that correspond to fractional motion used by traditional motion compensated prediction can be defined using this notation. These operations generate F predictions of x given by $\hat{x}_1, \hat{x}_2, \ldots, \hat{x}_F$, where the $i^{th}$ prediction is generated by multiplying with a predetermined interpolation matrix $A_i$ (M×N) via $$\hat{x}_i = A_i y.$$

In one embodiment, this set is augmented by defining a further set of predictions $\hat{x}_{F+1}, \hat{x}_{F+2}, \ldots, \hat{x}_{F+Q}$ based on nonlinear filtering as follows. Let $T_1, T_2, \ldots, T_K$ denote a set of thresholds and let $R_1, R_2, \ldots, R_L$ denote a set of percentages. Nonlinear prediction $\hat{x}_{F+j}$, j=1, . . . , K, is generated by thresholding the coefficients in d with threshold $T_j$, inverse transforming, and if necessary, by reducing the size of the result so that it matches the size of x. Nonlinear prediction $\hat{x}_{F+j}$, j=K+1, . . . , K+L, is generated by sorting the coefficients in d in terms of magnitude and zeroing the smallest 100–$R_j$ percent, inverse transforming, and if necessary, by reducing the size of the result so that it matches the size of x. Reducing the size can be accomplished by cropping/sampling or through filtering followed by cropping/sampling. If a block transform is used in generating d, sorting and zeroing can be done in each block of the transform. Further predictions can be obtained by scaling these predictions with a set of scaling constants. Also one can apply the operations in various combinations using at least one nonlinear operation to generate more predictions. Even further predictions can be obtained by applying these operations and combinations to $\hat{x}_i = A_i y$, i=1, . . . , F, in addition to y, or vice versa by applying $A_i$, i=1, . . . , F to the results of these operations. In one embodiment, P predictions are produced.

In one embodiment, the predictions are generated iteratively by adding correction terms to the generated predictions, and reapplying the above operations to the corrected predictions, and so on until a specific number of iterations is carried out. The parameters (thresholds, percentages, index sets, etc.) can be changed in each iteration in a prescribed way.

In one embodiment, in order not to generate trivial predictions, a scanning and elimination operation is used. One such operation is as follows. Each generated prediction is compared to applying the identity predictor to y, i.e., the predictor obtained by not modifying y in any way except for a possible size reduction, to the predictions $\hat{x}_1, \hat{x}_2, \ldots, \hat{x}_F$, and to predictions that were found to be valid up to that point. If the generated prediction is sufficiently different from these predictions, then it becomes a valid prediction; otherwise, it is deleted from the set of predictors. The remaining Q predictions form as set $\hat{x}_{F+1}, \hat{x}_{F+2}, \ldots, \hat{x}_{F+Q}$.

The remaining portions of the motion compensated prediction process are unchanged except that the decoder needs to be notified which of F+Q predictions it should construct rather than just the F predictions in the traditional case. (Since the scanning and elimination operation only uses data that is available to both the encoder and the decoder, the decoder can implement the scanning and elimination operation in parallel and determine the Q additional predictors.) Some parameters such as, for example, the values of the thresholds, percentages, and scaling coefficients can also be signaled to the decoder. Such signaling can be done in a manner well-known in the art.

While the above mentioned filtering procedures that use a single linear transform H provide acceptable performance, better performance can be obtained by using several different linear transforms, $H_1, H_2, \ldots, H_U$. In one embodiment, each of these transforms is used in a filtering procedure of its own to produce prediction estimates $\hat{x}_{F+j,1}, \hat{x}_{F+j,2}, \ldots, \hat{x}_{F+j,U}$. These individual prediction estimates are then combined to form an overall prediction $\hat{x}_{F+j}$ that is better than each of the prediction estimates.

Example of an Encoder and a Decoder

In one embodiment, a video encoder comprises a motion compensation prediction module to perform motion compensation to generate a motion compensated prediction using a block from a previously coded frame, a non-linear prediction filter to perform non-linear filtering on the block in the transform domain with a non-linear filter as part of a fractional interpolation process, an adder (subtractor) to subtract the motion compensated non-linear prediction from a block in a current frame to produce a residual frame, and a coder to code the residual frame.

Figure 2A:
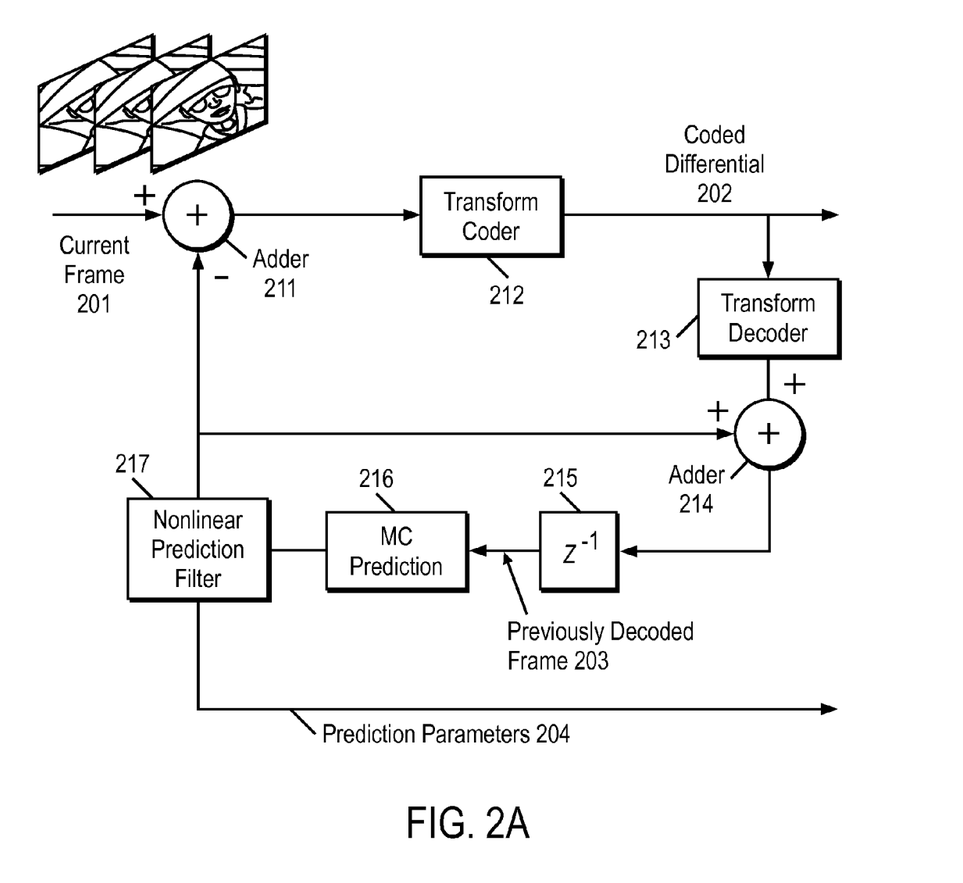
FIGS. 2A and 2B is a block diagram of an enhanced video encoder.

FIG. 2A is a block diagram of an enhanced video encoder. Referring to FIG. 2A, a motion compensated (MC) prediction module 216 generates a motion compensated prediction from a previously decoded frame 203. A non-linear prediction filter 217 that augments the motion compensated prediction as described herein to produce better predictions of the frame to be coded.

Adder 211 subtracts the augmented motion compensated prediction from a current frame 201 to obtain a residual frame. A transform coder 212 converts a residual frame to a coded differential 202 by, for example, using a combination of a transform, a quantizer, and an entropy encoder. During decoding, a transform decoder 213 converts the coded differential to a reconstructed residual frame by, for example, using a combination of an entropy decoder, an inverse quantizer, and an inverse transform. Adder 214 adds the reconstructed residual frame to the augmented motion compensated prediction to obtain a reconstructed frame. A delay element "$Z^{-1}$" 215 stores the reconstructed frame for future reference by MC prediction module 216.

Figure 2B:
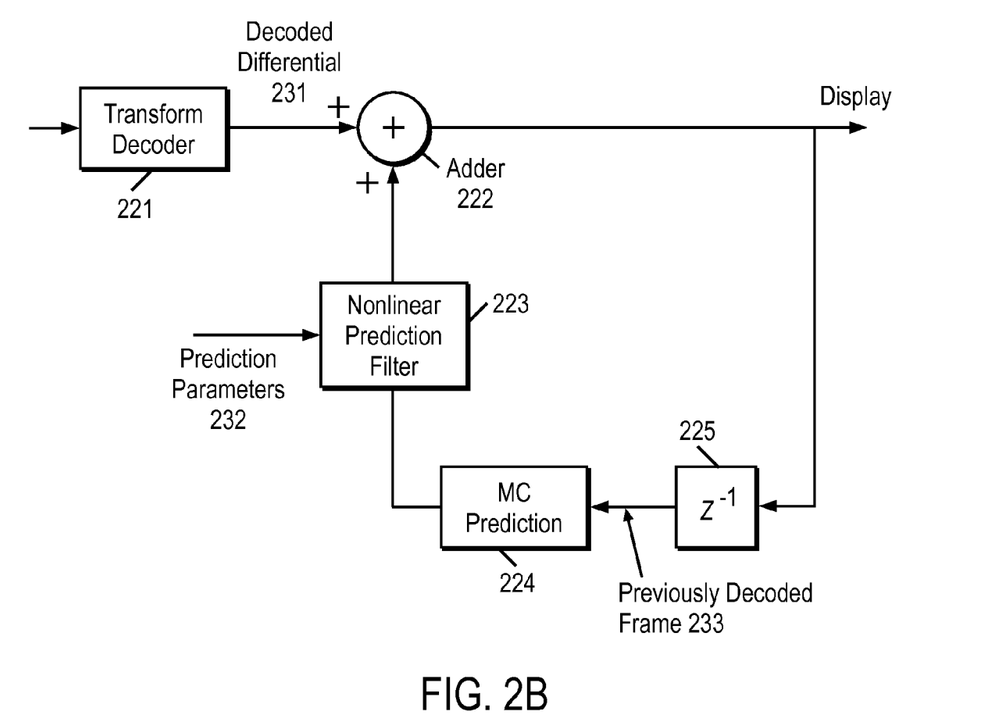

In one embodiment, a video decoder comprises a motion compensation unit to generate a predicted block using a block from a previously decoded frame, a non-linear prediction filter to perform non-linear filtering on the predicted block in the transform domain with a non-linear prediction filter as part of a fractional interpolation process to generate a non-linear prediction, a decoder to decode a residual frame, and an adder to add the residual frame to the non-linear prediction FIG. 2B is a block diagram of an enhanced video decoder. Referring to FIG. 2B, a MC prediction module 224 generates a motion compensated prediction from a previously decoded frame 233. A non-linear prediction filter 223 augments the motion compensated prediction to produce better predictions of the frame to be decoded. This is done in response to prediction parameters 232 received from the coded bitstream. A transform decoder 221 converts the coded differential 231 to a reconstructed residual frame by, for example, using a combination of an entropy decoder, an inverse quantizer, and an inverse transform. Adder 222 adds the reconstructed residual frame to the augmented motion compensated prediction to obtain a reconstructed frame that is output from the video decoder. The output may be sent to a display. A delay element "$Z^{-1}$" 225 also stores the filtered frame for future reference by MC prediction module 224.

Non-linear Prediction Filter Operation

In one embodiment, the non-linear prediction filter comprises a forward transform module to apply a transform to the motion compensated prediction to obtain a first set of transform coefficients, a module to perform a non-linear filtering operation in the transform domain to obtain a second set of transform coefficients from the first set, and an inverse transform module to apply an inverse transform to the second set of transform coefficients to generate the motion compensated non-linear prediction.

In one embodiment, the module to perform a non-linear filtering operation in the transform domain comprises a module to perform thresholding on each transform coefficient based on a threshold to identify a set of one or more transform coefficients to change and to modify the first set of transform coefficients to create a second set of transform coefficients by changing transform coefficients in the set of one or more transform coefficients. In another embodiment, the module to perform a non-linear filtering operation in the transform domain comprises a module to sort transform coefficients based on magnitude to identify transform coefficients to change and to modify those transform coefficients to create a second set of transform coefficients. In yet another embodiment, the module to perform a non-linear filtering operation in the transform domain comprises a module to perform percentage filtering on each transform coefficient of the block to identify a set of one or more transform coefficients to change and to modify those transform coefficients to create the second set of transform coefficients. In still another embodiment, the module to perform a non-linear filtering operation in the transform domain comprises a module to assign an index to each transform coefficient in the block, identify a set of one or more transform coefficients to change based on the indices, and modify the first set of transform coefficients to create the second set of transform coefficients by changing transform coefficients in the set of one or more transform coefficients. In yet another embodiment, the module to perform a non-linear filtering operation in the transform domain comprises a module to scale one or more transform coefficients to create the second set of transform coefficients.

In one embodiment, the linear transforms are given by a n×n block DCT and all of its $n^2$ spatial translations, and n is determined by the size of the video frame. For QCIF resolution frames, n equals four, for CIF resolution frames n equals four or n equals eight, etc. In general, n is expected to get larger for higher resolution video frames.

The operation of the nonlinear prediction filter is described in more detail below.

Figure 3:
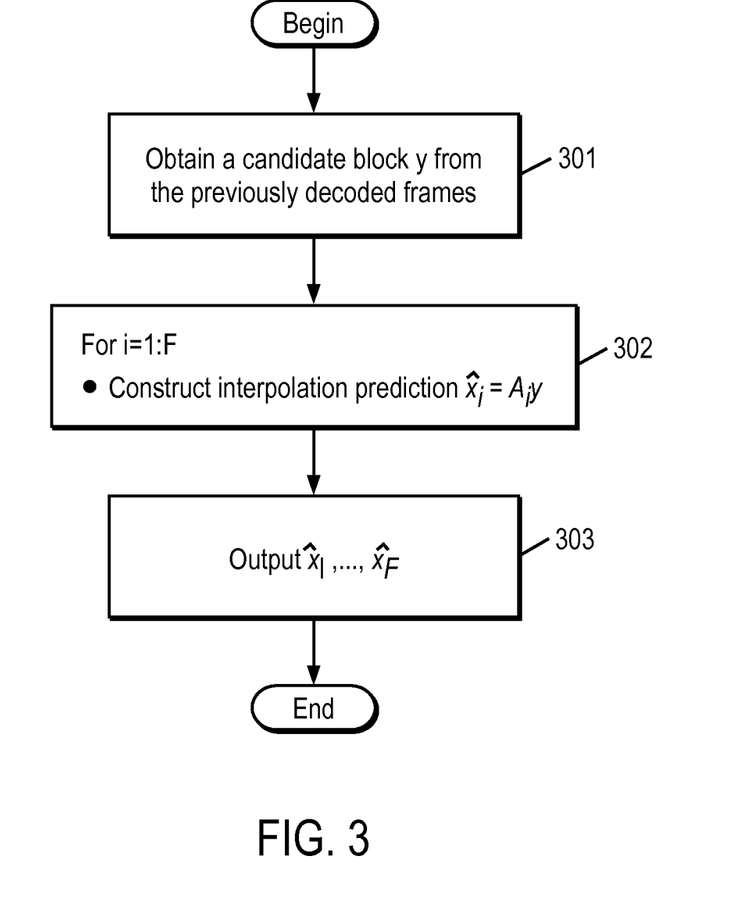
FIG. 3 is a flow diagram of a traditional motion compensated prediction formation process.

FIG. 3 is a flow diagram of a traditional motion compensated prediction formation process. Referring to FIG. 3, the process includes obtaining a candidate block y from the previously decoded framed (processing block 301). Using the candidate block y, processing logic generates F possible interpolation predictions $\hat{x}_i = A_i \cdot y$ of the block to be predicted (processing block 302). Then, the interpolation predictions $\hat{x}_1 \ldots \hat{x}_F$ are output (processing block 303). Thereafter, that process ends.

Figure 4:
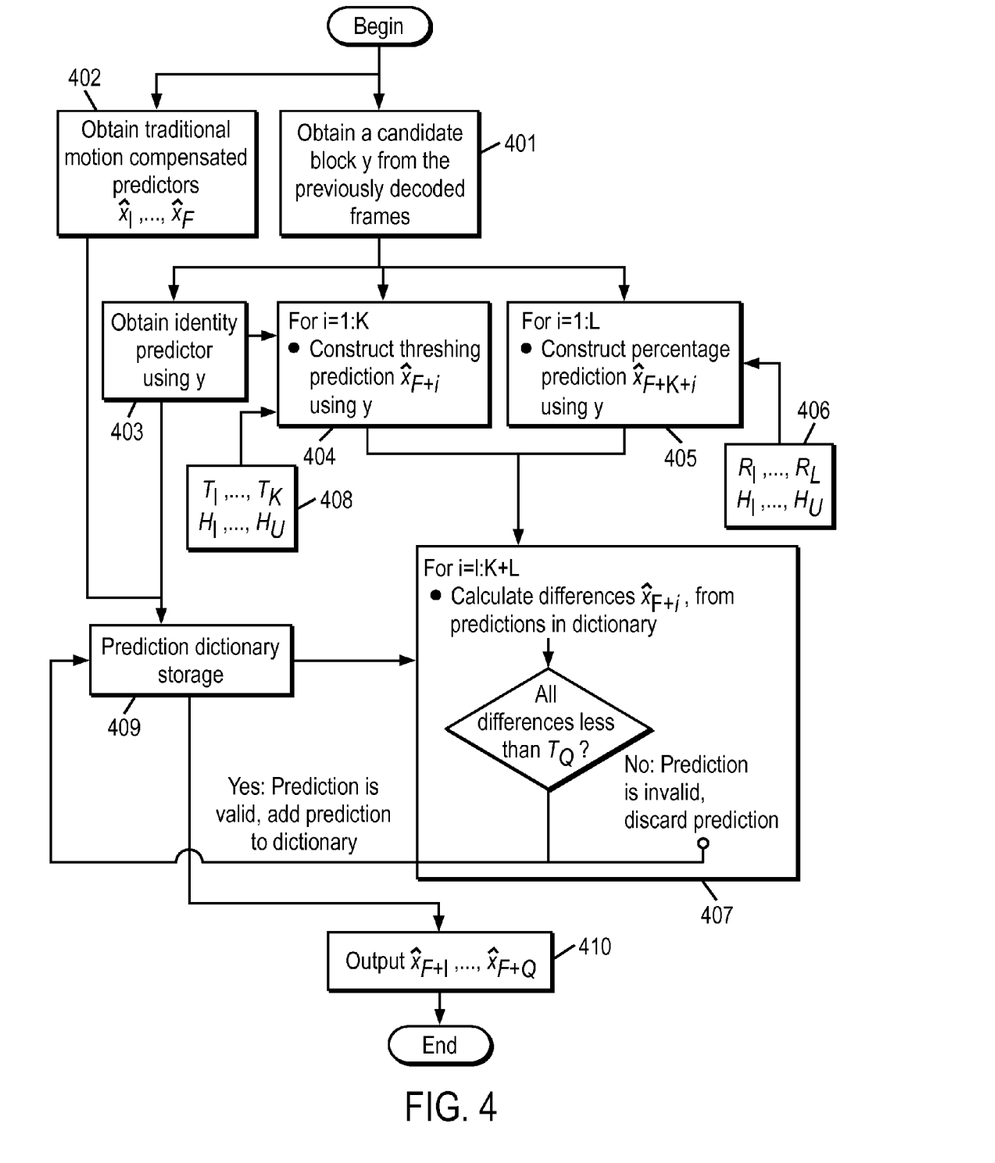
FIG. 4 is a flow diagram of one embodiment of a process for performing nonlinear prediction formation.

FIG. 4 is a flow diagram of one embodiment of a process for performing nonlinear prediction formation. The process is performed by processing logic that may comprise hardware (circuitry, dedicated logic, etc.), software (such as is run on a general purpose computer system or a dedicated machine), or a combination of both. In one embodiment, the process is performed by a nonlinear prediction filter.

Referring to FIG. 4, the process begins by obtaining a candidate block y from the previously decoded frames (processing block 401) and obtaining F traditional motion compensated predictors $\hat{x}_1 \ldots \hat{x}_F$ (processing block 402). Using a candidate block y from the previously decoded frames, processing logic obtains an identity predictor (processing block 403), which is stored along with the traditional motion compensated predictors $\hat{x}_1 \ldots \hat{x}_F$ in prediction dictionary storage 409.

Also using candidate block y, processing logic constructs K thresholding predictions $\hat{x}_{F+i}$ (processing block 404) and constructs L percentage predictions $\hat{x}_{F+K+I}$ (processing block 405). Processing logic constructs the thresholding predictions using parameters thresholds $T_1, \ldots, T_K$ and transforms $H_1, \ldots, H_U$ (408). Similarly, processing logic constructs L percentage predictions using percentages $R_1, \ldots, R_L$ and transforms $H_1, \ldots, H_U$ (406).

In one embodiment, thresholding is implemented by hard-thresholding each transform coefficient of y. If transform coefficient has magnitude greater than the threshold, it is unchanged; otherwise it is set to zero. In one embodiment, K and thresholds $T_1, T_2, \ldots, T_K$ are determined by the encoder for every frame to be encoded and signaled to the decoder.

In one embodiment, for percentage filtering, L and percentages $R_1, R_2, \ldots, R_L$ are determined by the encoder for every frame to be encoded and signaled to the decoder.

The thresholding predictions and the percentage predictions, predictions $\hat{x}_{F+j}$, j=1, \ldots , K+L, are sent to processing block 407 where processing logic compares each constructed prediction to the predictions stored in prediction dictionary storage 409. More specifically, in one embodiment, processing logic tests whether the differences are less than threshold $T_Q$. $T_Q$ can be an increasing function of the quantizer step-size. If not, the prediction is invalid and it is discarded. If the prediction is sufficiently different from all the dictionary elements, based on its comparison to threshold $T_Q$, then processing logic declares it valid and adds it to the dictionary to be used in further comparisons.

After all comparisons have been completed, processing logic outputs non-linear predictions $\hat{x}_{F+1}, \hat{x}_{F+2}, \ldots, \hat{x}_{F+Q}$ (processing block 410) and the process ends.

In one embodiment, nonlinear predictors are compared to the identity predictor, to $\hat{x}_1, \hat{x}_2, \ldots, \hat{x}_F$ and to predictions that were found to be valid up to that point as follows. First, a dictionary is constructed using the identity predictor, $\hat{x}_1$, $\hat{x}_2, \ldots, \hat{x}_F$. Each prediction is compared with each element of the dictionary by calculating the squared error between the prediction and the dictionary element. This squared error is then compared to a threshold $T_Q$. If the squared errors with all the dictionary elements are each greater than threshold $T_Q$, then the prediction is declared valid and added to the dictionary. Otherwise, the prediction is invalid and is discarded. In one embodiment, the threshold $T_Q$ is determined as a multiple of the quantizer step size squared; other equivalent parameters may be used.

Figure 5:
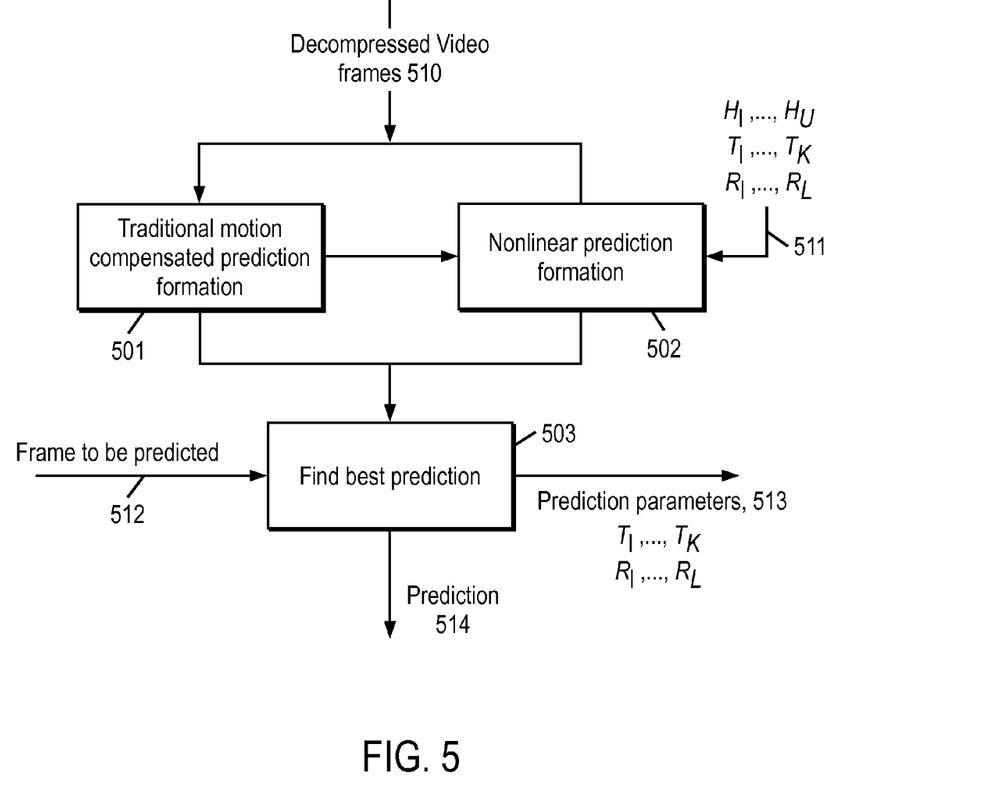
FIG. 5 is a flow diagram of one embodiment for nonlinear prediction process.

FIG. 5 is a flow diagram of one embodiment for nonlinear prediction process. The process is performed by processing logic that may comprise hardware (circuitry, dedicated logic, etc.), software (such as is run on a general purpose computer system or a dedicated machine), or a combination of both. In one embodiment, the nonlinear prediction processing is performed inside the encoding loop.

Referring to FIG. 5, processing begins by processing logic performing traditional motion compensated prediction formation (processing block 501) and nonlinear formation (processing block 502) to generate predictions for the frame to be encoded in response to decompressed video frames 510. Processing logic performs the nonlinear prediction formation using transforms $H_1, \ldots, H_U$, thresholds $T_1, \ldots, T_K$ and percentages $R_1, \ldots, R_L$ (511).

After forming the predictions, processing logic chooses the best prediction (processing block 503). This is done in response to the frames to be predicted (512). Then processing logic notifies the decoder the chosen prediction 514 and prediction parameters, thresholds $T_1, \ldots, T_K$ and percentages $R_1, \ldots, R_L$ (513). Thereafter, the process ends.

Figure 6:
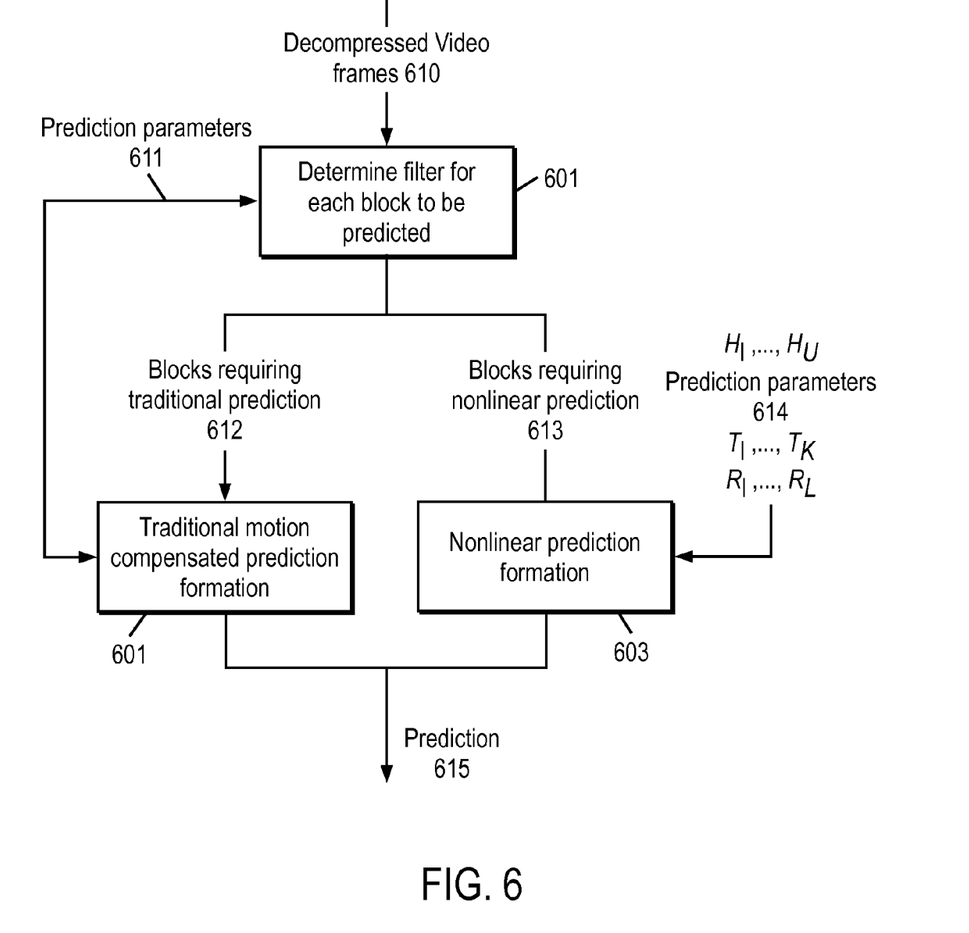
FIG. 6 is a flow diagram of one embodiment of a nonlinear prediction process.

FIG. 6 is a flow diagram of one embodiment of a nonlinear prediction process. The process is performed by processing logic that may comprise hardware (circuitry, dedicated logic, etc.), software (such as is run on a general purpose computer system or a dedicated machine), or a combination of both. In one embodiment, the nonlinear prediction process is performed in a coding loop of a video decoder.

Referring to FIG. 6, the process begins by processing logic determining a filter for each block to be predicted (processing block 601). In one embodiment, this determination is performed in response to decompressed video frame 610 and prediction parameters 611 included in the bitstream by the encoder.

After determining the filter, processing logic performs traditional motion compensation prediction formation (processing block 602). The traditional motion compensation prediction formation is performed on the blocks requiring traditional prediction 612. Processing logic also performs nonlinear prediction formation (processing block 603). In such a case, the nonlinear prediction formation is performed on blocks requiring nonlinear prediction 613 and transforms $H_1, \ldots, H_U$, prediction parameters, thresholds $T_1, \ldots, T_K$ and percentages $R_1, \ldots, R_L$ (614).

The outputs of both traditional motion compensated prediction formation and nonlinear prediction formation comprises prediction 615, which is the appropriate prediction for each block in the frame to be decoded.

Figure 7:
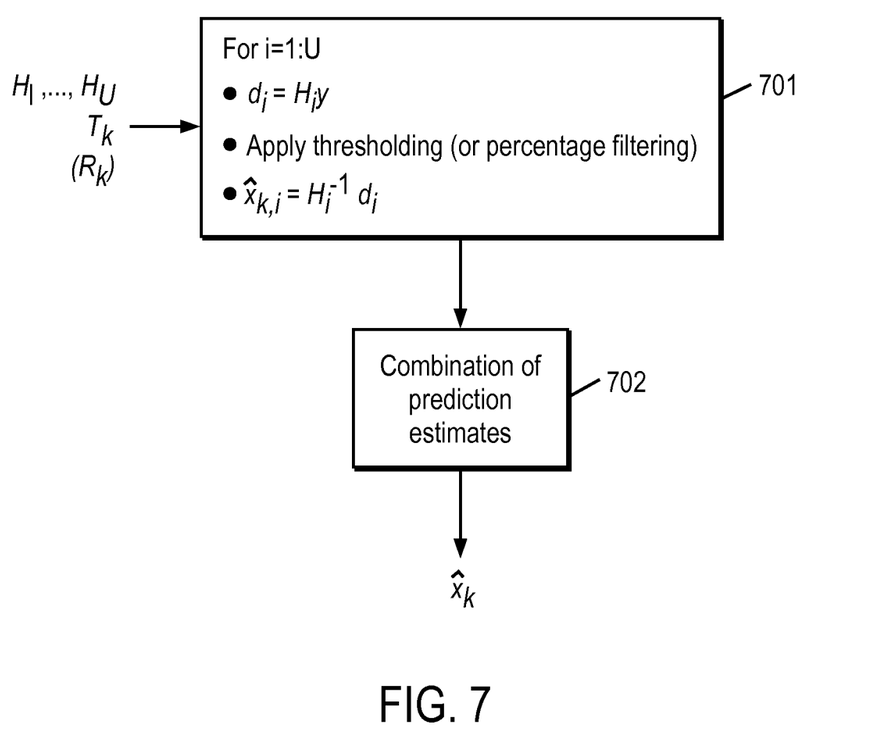
FIG. 7 is a flow diagram of one embodiment of a nonlinear prediction formation process.

FIG. 7 is a flow diagram of one embodiment of a nonlinear prediction formation process. The process is performed by processing logic that may comprise hardware (circuitry, dedicated logic, etc.), software (such as is run on a general purpose computer system or a dedicated machine), or a combination of both.

The process as described generates nonlinear predictions on candidate block y using an overcomplete transform. The present invention is not limited to using overcomplete transforms; other transforms may be used.

Referring to FIG. 7, the process begins by applying a forward transform to a candidate block to generate a first set of transform coefficients $d_i$, applying thresholding (or another filtering technique such as, for example, percentage filtering) to modify one or more of the coefficients in the set of coefficients $d_i$, and then applying an inverse transform to the transform coefficients of $d_i$ to generate the prediction (processing block 701). In one embodiment, this operation is performed for all blocks in a frame and is done in response to transforms $H_1, \ldots, H_U$, threshold $T_K$ and percentage $R_K$. In one embodiment, threshold $T_K$ is 2, 3.5, 7.2, or some number $\alpha$ times the quantizer step-size, i.e., $\alpha\Delta$, where $\alpha$ could be 0.2, 1, 3.45, 23, etc. The result is a non-linear prediction estimate. This is performed U times, such that U prediction estimates are formed. For an n×n block transform, U can be $n^2$, U can be set so that the U transforms provide a translation invariant decomposition, or U can be set based on computational complexity constraints.

After performing the filtering operation, processing logic combines the prediction estimates to produce an overall nonlinear prediction $\hat{x}_K$ (processing block 702). In one embodiment, to combine the individual prediction estimates, the combination is given by weighted averaging of the individual predictions $\hat{x}_{F+j,1}, \hat{x}_{F+j,2}, \ldots, \hat{x}_{F+j,U}$. This can be done with equal weights or using more sophisticated weight determination techniques known in the art, such as those described in, for example, Onur G. Guleryuz, "Weighted Overcomplete Denoising," Proc. Asilomar Conference on Signals and Systems, Pacific Grove, Calif., November 2003.

An Example of a Computer System

Figure 8:
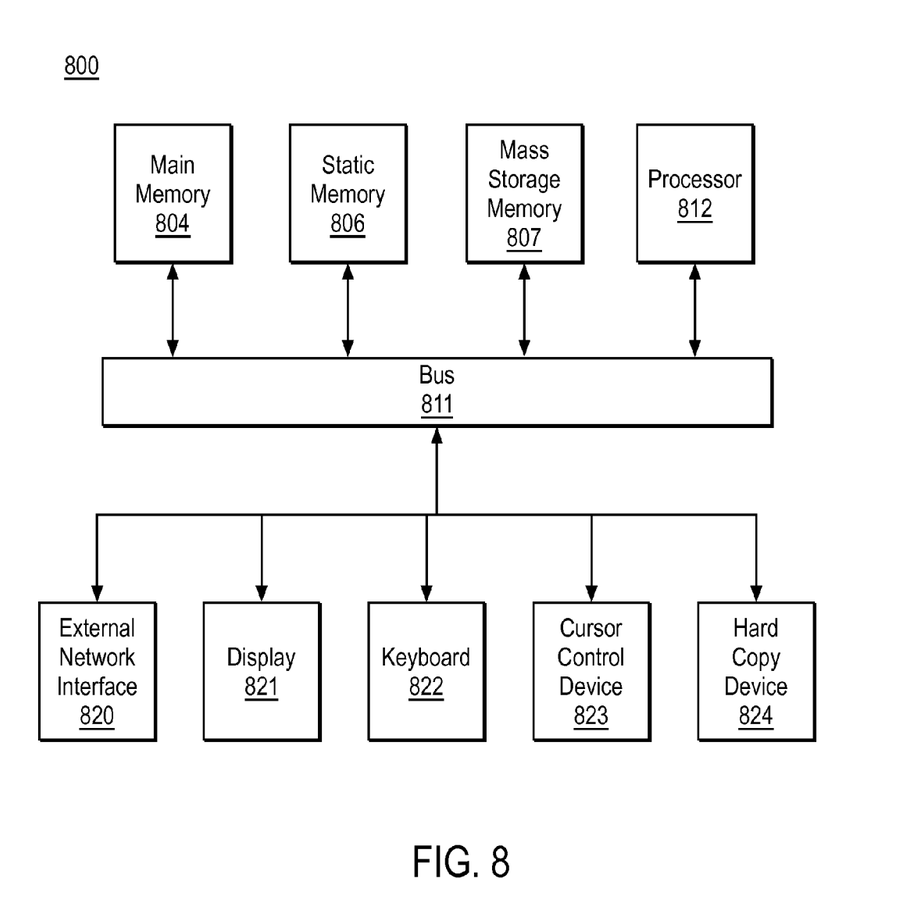
FIG. 8 is a block diagram of an exemplary computer system that may perform one or more of the operations described herein.

FIG. 8 is a block diagram of an exemplary computer system that may perform one or more of the operations described herein. Referring to FIG. 8, computer system 800 may comprise an exemplary client or server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for marking information on a medium such as paper, film, or similar types of media. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
    performing motion compensation to generate a motion compensated prediction using a block from a previously coded frame;
    performing non-linear filtering on the motion compensated prediction in a transform domain with a non-linear filter as part of a fractional interpolation process to generate a motion compensated non-linear prediction, wherein performing non-linear filtering comprises
        applying a transform to the motion compensated prediction to obtain a first set of transform coefficients,
        percentage filtering each transform coefficient of the block by sorting the first set of transform coefficients based on magnitude and identifying a set of one or more transform coefficients to change to zero that are not within a largest percentage of transform coefficients,
        modifying the first set of transform coefficients to create a second set of transform coefficients by zeroing the transform coefficients in the set of one or more transform coefficients, and
        applying an inverse transform to the second set of transform coefficients to generate the motion compensated non-linear prediction; subtracting the motion compensated non-linear prediction from a block in a current frame to produce a residual frame; and
        coding the residual frame.

2. The method defined in claim 1 further comprising applying non-linear filtering to a previously decoded frame, and wherein performing motion compensation comprises generating the motion compensated prediction using the non-linearly filtered previously decoded frame.

3. The method defined in claim 1 further comprising adding into a coded bitstream information indicative of the non-linear filter used to filter the motion compensated non-linear prediction.

4. The method defined in claim 3 further comprising adding information indicative of the transform to signal decoder as to which transform to apply to create the transform coefficients during decoding.

5. The method defined in claim 1 wherein the non-linear filter is one of a plurality of filters, and further comprising selecting the non-linear filter from among the plurality of filters.

6. The method defined in claim 1 further comprising:
    generating a plurality of motion compensated non-linear predictions for a video frame; and
    eliminating one or more of the plurality of motion compensated non-linear predictions based on differences with previously found predictions.

7. The method of claim 1 wherein transform coefficients exceed in number candidate block elements.

8. An encoder comprising:
    a motion compensation prediction module to perform motion compensation to generate a motion compensated prediction using a block from a previously coded frame;
    a non-linear prediction filter to perform non-linear filtering on the block in a transform domain with a non-linear filter as part of a fractional interpolation process to generate a motion compensated non-linear prediction, wherein the non-linear prediction filter comprises
        a forward transform module to apply a transform to the motion compensated prediction to obtain a first set of transform coefficients,
        a module to perform percentage filtering to each transform coefficient of the block by sorting the first set of transform coefficients based on magnitude and identifying a set of one or more transform coefficients to change to zero that are not within a largest percentage of transform coefficients, and to modify the first set of transform coefficients to create a second set of transform coefficients by zeroing the transform coefficients in the set of one or more transform coefficients, and
        an inverse transform module to apply an inverse transform to the second set of transform coefficients to generate the motion compensated non-linear prediction;
    a subtractor to subtract the motion compensated non-linear prediction from a block in a current frame to produce a residual frame; and
    a coder to code the residual frame.

9. An article of manufacture having one or more non-transitory computer readable media storing instructions thereon which, when executed by a system, cause the system to perform a method comprising:
    performing motion compensation to generate a motion compensated prediction using a block from a previously coded frame;
    performing non-linear filtering on the motion compensated prediction in a transform domain with a non-linear filter as part of a fractional interpolation process to generate motion compensated non-linear prediction, wherein performing non-linear filtering comprises
        applying a transform to the motion compensated prediction to obtain a first set of transform coefficients,
        percentage filtering each transform coefficient of the block by sorting the first set of transform coefficients based on magnitude and identifying a set of one or more transform coefficients to change to zero that are not within a largest percentage of transform coefficients,
        modifying the first set of transform coefficients to create a second set of transform coefficients by zeroing the transform coefficients in the set of one or more transform coefficients, and
        applying an inverse transform to the second set of transform coefficients to generate the motion compensated non-linear prediction;

subtracting the motion compensated non-linear prediction from a block in a current frame to produce a residual frame; and coding the residual frame.

10. The article of manufacture defined in claim 9 wherein the method further comprises applying non-linear filtering to a previously decoded frame, and wherein performing motion compensation comprises generating the motion compensated prediction using the non-linearly filtered previously decoded frame.

11. A method comprising:

generating a predicted block using a block from a previously decoded frame;

performing non-linear filtering on the predicted block in the transform domain with a non-linear prediction filter as part of a fractional interpolation process to generate a non-linear prediction, wherein performing non-linear filtering comprises applying a transform to the predicted block to obtain a first set of transform coefficients, percentage filtering each transform coefficient of the block by sorting the first set of transform coefficients based on magnitude and identifying a set of one or more transform coefficients to change to zero that are not within a largest percentage of transform coefficients, modifying the first set of transform coefficients to create a second set of transform coefficients by zeroing the transform coefficients in the set of one or more transform coefficients, and applying an inverse transform to the second set of transform coefficients to generate the non-linear prediction;

decoding a residual frame; and adding the residual frame to the non-linear prediction.

12. The method defined in claim 11 wherein non-linear filtering is based on prediction parameters.

13. The method defined in claim 12 further comprising determining the non-linear filter based on the prediction parameters.

14. An apparatus comprising:

a motion compensation unit to generate a predicted block using a block from a previously decoded frame;

a non-linear prediction filter to perform non-linear filtering on the predicted block in a transform domain with a non-linear prediction filter as part of a fractional interpolation process to generate a non-linear prediction, wherein the non-linear prediction filter comprises a forward transform module to apply a transform to the predicted block to obtain a first set of transform coefficients, a module to perform percentage filtering each transform coefficient of the block by sorting the first set of transform coefficients based on magnitude and identifying a set of one or more transform coefficients to change to zero that are not within a largest percentage of transform coefficients, and to modify the first set of transform coefficients to create a second set of transform coefficients by zeroing the transform coefficients in the set of one or more transform coefficients, and an inverse transform module to apply an inverse transform to the second set of transform coefficients to generate the non-linear prediction; a decoder to decode a residual frame; and an adder to add the residual frame to the non-linear prediction.

15. An article of manufacture having one or more non-transitory computer readable media storing instructions thereon which, when executed by a system, cause the system to perform a method comprising:

generating a predicted block using a block from a previously decoded frame; performing non-linear filtering on the predicted block in a transform domain with a non-linear prediction filter as part of a fractional interpolation process to generate a non-linear prediction, wherein performing non-linear filtering comprises applying a transform to the predicted block to obtain a first set of transform coefficients, percentage filtering each transform coefficient of the block by sorting the first set of transform coefficients based on magnitude and identifying a set of one or more transform coefficients to change to zero that are not within a largest percentage of transform coefficients, modifying the first set of transform coefficients to create a second set of transform coefficients by zeroing the transform coefficients in the set of one or more transform coefficients, and applying an inverse transform to the second set of transform coefficients to generate the non-linear prediction;

decoding a residual frame; and adding the residual frame to the non-linear prediction.

* * * * *